United States Patent
Aldeghi et al.

(10) Patent No.: US 12,484,458 B2
(45) Date of Patent: Nov. 25, 2025

(54) SCALABLE MAGNETICALLY CONTROLLED QUBIT

(71) Applicant: International Business Machines Corporation, Armonk, NY (US)

(72) Inventors: Michele Aldeghi, Cadro (CH); Rolf Allenspach, Adliswil (CH); Gian R. von Salis, Aeugst am Albis (CH)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 18/297,142

(22) Filed: Apr. 7, 2023

(65) Prior Publication Data

US 2024/0423102 A1    Dec. 19, 2024

(51) Int. Cl.
| | |
|---|---|
| *H10N 60/80* | (2023.01) |
| *G06N 10/40* | (2022.01) |
| *H10N 60/01* | (2023.01) |
| *H10N 60/10* | (2023.01) |

(52) U.S. Cl.
CPC .............. *H10N 60/80* (2023.02); *G06N 10/40* (2022.01); *H10N 60/01* (2023.02); *H10N 60/11* (2023.02); *H10N 60/128* (2023.02)

(58) Field of Classification Search
CPC ...... H10N 60/80; H10N 60/11; H10N 60/128; G06N 10/40; G06N 10/00
See application file for complete search history.

(56) References Cited

U.S. PATENT DOCUMENTS

| | | |
|---|---|---|
| 7,336,515 B2 | 2/2008 | Allenspach |
| 2021/0028344 A1* | 1/2021 | Petta ................. H10D 48/3835 |
| 2021/0142204 A1 | 5/2021 | Hendrickson |
| 2022/0028927 A1 | 1/2022 | Lauer |
| 2022/0083890 A1 | 3/2022 | Simion |

OTHER PUBLICATIONS

Boter et al. "Spiderweb array: A sparse spin-qubit array," arXiv:2110.00189, Aug. 25, 2022, 19 pages.
Chatterjee et al., "Semiconductor Qubits In Practice," arXiv:2005.06564v1, May 13, 2020, 28 pages.
Lee et al., "High-Quality Cobalt Thin Films by Plasma-Enhanced Atomic Layer Deposition," Electrochemical and Solid- State Letters, 9 (11) G323-G325, 2006.
Nowack et al., "Coherent Control of a Single Electron Spin with Electric Fields," arXiv:0707.3080v2, Mar. 10, 2008, 24 pages.

(Continued)

*Primary Examiner* — Matthew L Reames
(74) *Attorney, Agent, or Firm* — Randy Tejeda (57) ABSTRACT

A qubit device comprising: a semiconductor substrate layer; a semiconductor substrate layer; a set of control gates defining one or more lines of two or more quantum dots along the substrate layer, each quantum dot being configured for holding a qubit; and a magnet system providing at the substrate layer a superposition of external and local magnetic fields such that qubit spin resonance frequencies of each pair of adjacent quantum dots in each line are different, the magnet system comprising an external magnetic field source for providing the external magnetic field and comprising a magnet on top of every other quantum dot for providing the local magnetic field.

20 Claims, 6 Drawing Sheets

(56) References Cited

OTHER PUBLICATIONS

Pla et al., "A single-atom electron spin qubit in silicon," arXiv:1305.4481, May 2013, 13 pages.
Tadokoro et al. "Designs for a two-dimensional Si quantum dot array with spin qubit addressability," Scientific Reports, 11, 19406, 2021, 7 pages.
Turcotte et al., "Optimized Micromagnet Geometries for Majorana Zero Modes in Low G-Factor Materials," arXiv:1904.06275v2, Feb. 3, 2021, 13 pages.
Yoneda et al., "Robust micro-magnet design for fast electrical manipulations of single spins in quantum dots," arXiv:1507.01765v1, Jul. 2015, 11 pages.

* cited by examiner

SCALABLE MAGNETICALLY CONTROLLED QUBIT

BACKGROUND

The present invention relates generally to the field of quantum processors, and more particularly to qubit devices.

The spin degree of freedom of an electron may provide a two-level quantum system to encode the information in the form of a quantum bit (qubit). The qubit may, for example, include a spin up state and a spin down state, and a superposition state of both the spin up and spin down states at the same time.

SUMMARY

Various embodiments provide a qubit device, method for operating a qubit device as described by the subject matter of the independent claims. Advantageous embodiments are described in the dependent claims. Embodiments of the present invention can be freely combined with each other if they are not mutually exclusive.

In one aspect, the invention relates to a qubit device comprising a semiconductor substrate layer; a set of control gates configured to define one or more lines of two or more quantum dots along the substrate layer, each quantum dot being configured for holding a qubit; a magnet system configured to provide at the substrate layer a superposition of an external and local magnetic fields such that qubit spin resonance frequencies of adjacent quantum dots of each line are different, the magnet system comprising an external magnetic field source for providing the external magnetic field and comprising a magnet on top of every other quantum dot for providing the local magnetic field.

In one aspect the invention relates to a method for forming a qubit device. The method comprises: providing a semiconductor substrate layer; providing a set of control gates configured to define one or more lines of two or more quantum dots along the substrate layer, each quantum dot being configured for holding a qubit; providing a superposition of an external and local magnetic fields at the substrate layer such that qubit spin resonance frequencies of adjacent quantum dots of each line are different, the magnet system comprising an external magnetic field source for providing the external magnetic field and comprising a magnet on top of every other quantum dot for providing the local magnetic field.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enable to manipulate electron spins for the purpose of implementing a quantum computer, in specific by using a technique named electron dipole spin resonance (EDSR). This technique may be based on creating a magnetic field gradient, where the electron wavefunction may be displaced by means of electric gates inducing coherent rotations of the spin. For that, the present subject matter may provide a qubit device that allows for EDSR-based single-qubit gates e.g., within a scalable array (e.g., 2D array) of quantum dots.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

One Dimensional (1D) Quantum-Dot Array

The qubit device may be provided with a layer structure including a substrate layer and a layer of gates on top of the substrate layer. The layer of gates may comprise control gates. The control gates may be configured to define or induce a line (l1) of a number $N_{l1}$ of quantum dots along an in-plane direction of the substrate layer, where $N_{l1} \geq 2$. The "in-plane" may refer to a plane parallel to or generally parallel to the surface of the substrate layer and the "out-of-plane" may refer to a direction outside the surface of the substrate layer. For example, a reference frame (x, y, z) may be provided, wherein the quantum dots are arranged along the "in-plane" direction which is a direction along the x-y plane, and the "out-of-plane" direction is along the z direction.

The quantum dots may be electrostatically confined quantum dots along the substrate layer. Each quantum dot of the quantum dots may hold an electron defining a qubit. The quantum dot may be referred to as $QD_i^{l1}$, where the superscript l1 in the quantum dot $QD_i^{l1}$ indicates that the quantum dot $QD_i^{l1}$ belongs to the line l1 and the subscript i indicates the index of the quantum dot. The index i may be assigned to the quantum dots based on their location along the line l1. For simplification of the description, the index may be incremented following the order of the quantum dots on the line l1. The index i of the quantum dot $QD_i^{l1}$ of the line l1 may be a number between 1 and $N_{l1}$. That is, the line l1 may comprise a series or chain of the quantum dots $QD_1^{l1}$, $QD_2^{l1}$ ... $QD_{N_{l1}}^{l1}$, where $QD_1^{l1}$ is located at an extreme end of the line l1, followed by its neighbouring quantum dot $QD_2^{l1}$, which is in turn followed by its neighbouring quantum dot $QD_3^{l1}$ and so on up to the other extreme end of the line l1 that comprises the quantum dot $QD_{N_{l1}}^{l1}$. Two quantum dots $QD_i^{l1}$ and $QD_j^{l1}$ are adjacent if $i=j\pm1$. The quantum dots may be provided such that the qubit-qubit distance (QQ) between each pair of adjacent quantum dots $QD_i^{l1}$ and $QD_j^{l1}$ is the same or is considered similar within an accuracy range. The line l1 of quantum dots may provide a 1D quantum-dot array. The line l1 may be a line parallel to the in-plane direction.

The qubit device may further comprise a magnet system that is configured to provide an external magnetic field. The magnet system may further provide local magnetic fields at the quantum dots $QD_1^{l1}$, $QD_2^{l1}$ ... $QD_{N_{l1}}^{l1}$ respectively. The magnet system may, thus, provide a superposition of the external magnetic field with the local magnetic fields. This may result in each quantum dot $QD_i^{l1}$ being covered by a corresponding magnetic field $F_i^{l1}$. The spin resonance frequency may be the Larmor frequency. This superposition may enable that Larmor frequencies of adjacent quantum dots of the line l1 are different. For example, the magnetic fields $F_i^{l1}$ and $F_j^{l1}$ where $i=j\pm1$ are different with respect to field direction and/or field strength.

The qubit device with the 1D quantum-dot array may thus have the following advantages. The qubit device may, for example, be used in a quantum processor of a quantum computing device. Examples of algorithms which may be implemented include quantum chemistry algorithms and Grover's search algorithm. The qubit device may enable a noise sweet spot due to a minimal in-plane decoherence gradient and maximal driving gradient at qubit location. At qubit locations, a driving gradient of e.g., 4 mT/nm may be reached, which may double current state-of-the-art values. The qubit device may enable a single qubit addressability e.g., due to the array arrangement of the magnet system, adjacent qubits may have different Larmor frequencies (the difference may, for example, be more than 1000 MHz). The qubit device may be scalable so that any number of qubits can be placed on the line.

In one example, the local magnetic fields may be provided such that a magnetic field gradient perpendicular to the total magnetic field is maximized at a location of the quantum dot. The magnetic field gradient perpendicular to the total magnetic field is maximized at each location of the quantum dots. For example, the magnetic field gradient perpendicular to the total magnetic field may be maximized, such that the qubit manipulation speed using an electric dipole spin resonance (EDSR) method may be maximized. The local magnetic fields may, for example, be provided by magnets such as nanomagnets. The tailoring of a nanomagnet (e.g., using shape, size, position, or material) covering a specific quantum dot may result in that a magnetic field gradient perpendicular to the total magnetic field is maximized at a location of said specific quantum dot.

In one example, the local magnetic fields may be provided such that a magnetic field gradient parallel to the total magnetic field is minimized at a location of the quantum dot. The magnetic field gradient parallel to the total magnetic field is minimized at each location of the quantum dots. For example, the magnetic field gradient parallel to the total magnetic field may be minimized, such that the dephasing of the qubit is minimized. The local magnetic fields may, for example, be provided by magnets such as nanomagnets. The tailoring of a nanomagnet (e.g., using shape, size, position, or material) covering a specific quantum dot may result in that a magnetic field gradient parallel to the total magnetic field is minimized at a location of said specific quantum dot.

The magnet system may comprise an external magnetic field source for providing the external magnetic field. The magnet system may further comprise a magnet, MGR on top of every other quantum dot of the line l1 for providing the local magnetic field on said every other quantum dot. Each magnet may extend above or cover a single respective quantum dot. In one example, the magnets may be placed in a layer on top of the layer of gates. Each magnet may also serve at the same time as the plunger gate controlling the quantum dot hosting the qubit. The superscript l1 in the magnet $MG_k^{l1}$ may indicate that the magnet covers or extends over a quantum dot of line l1, and the subscript k indicates the index of the magnet. The index k may be assigned to the magnets based on their location order along the line l1. For simplification of the description, the index k may be incremented following the order of the magnets on top of the line l1. The index k of the magnet $MG_k^{l1}$ may be a number between 1 and $L_{mg}^{l1}$. That is, the qubit device may comprise a series or chain of the magnets $MG_1^{l1}$, $MG_2^{l1}$ .... $MG_{L_{mg}}^{l1}$, where $MG_k^{l1}$ is located at an extreme end, followed by its neighbouring magnet $MG_2^{l1}$, which is in turn followed by its neighbouring magnet $MG_3^{l1}$ and so on up to the other extreme end on the line l1 that comprises the magnet $MG_{L_{mg}}^{l1}$. The magnets $MG_1^{l1}$, $MG_2^{l1}$ ... $MG_{L_{mg}}^{l1}$ may form a line of magnets which may be named herein magnet line (magnet row or magnet column). The magnets $MG_1^{l1}$, ... and $MG_{L_{mg}}^{l1}$ may thus form a 1D array of magnets on top of corresponding quantum dots $QD_1^{l1}, \ldots$ and $QD_{L_{mg}}{}^{l1}$, respectively, e.g., the number of magnets $L_{mg}{}^{l1}$ may be smaller than the number of quantum dots $N_{l1}$, $$L_{mg}^{l1} < N_{l1}.$$

For example, the number $L_{mg}{}^{l1}$ of magnets that extent over the quantum dots of the line 11 may be defined as half the number of quantum dots of the line 11, $$L_{mg}^{l1} = \frac{N_{l1}}{2},$$

wherein each magnet is associated with a respective pair of quantum dots.

Thus, the qubit device may comprise a 1D array of magnets that extend over the respective quantum dots of a 1D quantum-dot array. The qubit device may thus be said as having a 1D structure, e.g., defined by the 1D array of the magnets and the 1D array of quantum dots.

Each magnet $MG_k^{l1}$ that extends over a quantum dot of the line 11 may, for example, be a nanomagnet, where $k=1, \ldots, L_{mg}{}^{l1}$. The magnet $MG_k^{l1}$ may be a permanent magnet having a length, along the longitudinal direction of the line 11, smaller than a maximum submicron length. Additionally, the magnet $MG_k^{l1}$ may have a width, along the transverse direction of the line 11 in plane with respect to the substrate layer, smaller than a maximum submicron width. Additionally, the magnet $MG_k^{l1}$ may have a height or thickness, along the out-of-plane direction with respect to the substrate layer, smaller than a maximum submicron height.

In one example, the maximum submicron length may be in the range of [10 nm, 500 nm]. In one example, the maximum submicron width may be in the range of [10 nm, 500 nm]. In one example, the maximum submicron height may be in the range of [10 nm, 500 nm].

In one example, the magnet $MG_k^{l1}$ that extends over a quantum dot of the line 11 may have a magnet size $S_k^{l1}$ and a distance D to the corresponding quantum dot. The magnet size $S_k^{l1}$ of the magnet $MG_k^{l1}$ may, for example, be defined by its length, width and/or thickness. For example, the magnet size $S_k^{l1}$ of the magnet $MG_k^{l1}$ may be the length of the magnet $MG_k^{l1}$. The distance D may be the distance between the bottom surface of the magnet and the top surface of the corresponding quantum dot. The magnet size $S_k^{l1}$ of the magnet $MG_k^{l1}$ and distance D may be increased or decreased independently. This increasing or decreasing may be performed within limits which may be defined by the size of the quantum dot and/or the size of the magnet and/or the amount/size of the gates used to control the qubit. For example, the size $S_k^{l1}$ of the magnet may not be much bigger than the distance D e.g., $S_k^{l1} < 20 \times D$ or the distance D may be between 10% of the magnet size $S_k^{l1}$ to 500% of the magnet size $S_k^{l1}$. In one example, the magnet size $S_k^{l1}$ of the magnet $MG_k^{l1}$ may be equal to 50 nanometres, $S_k^{l1} = 50$ nm and the distance D may be equal to 25 nanometres, D=25 nm. In one example, the magnets may be provided such that twice the pitch of the quantum dot exceeds the magnet size by a minimum distance.

Each magnet $MG_k^{l1}$ that extends over a quantum dot of the line 11 may, for example, have a shape ($shape_k^{l1}$) and an orientation ($O_k^{l1}$). The shape $shape_k^{l1}$ may, for example, be a cubic shape, a cuboid shape, or a spheric shape. The orientation $O_k^{l1}$ of the magnet $MG_k^{l1}$ may be tilted or planar with respect to the in-plane surface of the substrate layer.

In one first magnet design example, all the magnets that extend over the quantum dots of the line 11 may have the same shape, the same size, and the same orientation. That is, $shape_k^{l1} = shape_h^{l1}$ and $O_k^{l1} = O_h^{l1}$ and $S_k^{l1} = S_h^{l1}$, $\forall k$ and $\forall h$, and k, h=1, ..., $L_{mg}{}^{l1}$. With this symmetric structure, best (e.g., optimal) driving gradients may be achieved at the quantum dots.

In one second magnet design example, the magnets that extend over the quantum dots of the line 11 may have a number $ns_D$ of two or more different shapes, $ns_D \geq 2$. In this second magnet design example, the magnets may have the same orientation or a number $no_D$ of two or more different orientations, $no_D \geq 2$. For example, the magnets may have two different shapes, i.e., $ns_D = 2$. The two shapes, may, for example, be cubic and cuboid shapes. Similarly, the magnets may have two different orientations, i.e., $no_D = 2$. The two orientations, may, for example, be tilted and planar orientations. For that, the magnets $MG_k^{l1}$ having an odd index k may have the same shape while the magnets $MG_k^{l1}$ having an even index k may have a different shape. That is, the magnets may be provided such that $shape_k^{l1} \neq shape_h^{l1}$ if $k = h \pm 1$ and $shape_k^{l1} = shape_h^{l1}$ if $k = h \pm 2$ and $O_k^{l1} = O_h^{l1}$ $\forall k$ and $\forall h$. Or, $shape_k^{l1} \neq shape_h^{l1}$ if $k = h \pm 1$ and $shape_k^{l1} = shape_h^{l1}$ if $k = h \pm 2$ and $O_k^{l1} \neq O_h^{l1}$ if $k = h \pm 1$ and $O_k^{l1} = O_h^{l1}$ if $k = h \pm 2$. The second magnet design example may be advantageous as the addressability between next-neighbouring qubits may further be improved and a flexible implementation of the qubit device may be enabled.

In one third magnet design example, the magnets that extend over the quantum dots of the line 11 may have a number $nz_D$ of two or more different sizes, $nz_D \geq 2$. For example, the size of neighbouring magnets may be varied. Additionally, the magnets may have the same orientation or two or more different orientations. Additionally, or alternatively, the magnets may have the same shape or two or more different shapes. For example, in case $nz_D = no_D = ns_D = 2$, the magnets may be provided such that:

---

$S_k^{l1} \neq S_h^{l1}$ if $k = h \pm 1$ and $S_k^{l1} = S_h^{l1}$ if $k = h \pm 2$ and $O_k^{l1} = O_h^{l1}$ $\forall k$ and $\forall h$, and $shape_k^{l1} = shape_h^{l1}$ $\forall k$ and $\forall h$. Or,
$S_k^{l1} \neq S_h^{l1}$ if $k = h \pm 1$ and $S_k^{l1} = S_h^{l1}$ if $k = h \pm 2$ and $O_k^{l1} \neq O_h^{l1}$ if $k = h \pm 1$ and $O_k^{l1} = O_h^{l1}$ if $k = h \pm 2$, and $shape_k^{l1} = shape_h^{l1}$ $\forall k$ and $\forall h$. Or,
$S_k^{l1} \neq S_h^{l1}$ if $k = h \pm 1$ and $S_k^{l1} = S_h^{l1}$ if $k = h \pm 2$ and $O_k^{l1} \neq O_h^{l1}$ if $k = h \pm 1$ and $O_k^{l1} = O_h^{l1}$ if $k = h \pm 2$, and $shape_k^{l1} \neq shape_h^{l1}$ if $k = h \pm 1$ and $shape_k^{l1} = shape_h^{l1}$ if $k = h \pm 2$.

---

If the size is kept constant, the best driving gradients may be achieved. If it is changed, the addressability between next-neighbouring qubits may further be improved. The variation in size may happen in both x and y direction. The change in size between neighbouring magnets can be varied.

In one example, the external magnetic field is tilted with a predefined angle (θ) and angle (φ). The angle θ may be the projection of the magnetic field direction on a plane parallel to the substrate layer and parallel to a row (e.g., the line 11) of quantum dots. The angle φ may be the angle between the out of plane direction and the external magnetic field.

In one example, the angle θ is between 0 degree and 90 degrees. That is, $0° \leq \theta \leq 90°$. In one example, the angle φ is between 0 degree and 180 degrees. That is, $0° \leq \varphi \leq 180°$.

In another example, the angle θ is in a range: [45−d1, 45+d2] degree, where d1 and d2 are predefined tolerance angle ranges in degree. That is, 45°−d1≤θ≤45°+d2. For example, d1 is equal to d2, d1=d2. Alternatively, d1 is different from d2, d1 ≠d2.

In one example, the set of control gates comprise a plunger gate on top of each quantum dot, and barrier gates alternating with the plunger gates. The barrier gate may refer to a gate configured to confine the quantum dots in a longitudinal direction of the row of quantum dots. Each barrier gate may define a tunnel barrier between each pair of adjacent quantum dots. The plunger gate may refer to a gate configured to control a (electrochemical) potential of a respective quantum dot. Each plunger gate may be associated with a respective quantum dot. Each plunger gate may control the charge accumulated at the associated quantum dot.

The present subject matter may further be advantageous as it may improve the development of a scalable multi-qubit processor by extending the 1D array structure to a two-dimensional (2D) structure.

2D Quantum-Dot Array

In one example, additional lines l2, l3 . . . of quantum dots may be defined or induced in the substrate layer by the control gates. For example, the lines may be provided as rows and columns. The lines may comprise a number $M_r$ of rows and a number $M_c$ of columns. For example, the rows may be indexed with odd numbers (e.g., l1, l3 . . . l(2×M+1)$_r$) where $M_r$ is the number of rows. The columns may be indexed with even numbers (e.g., l2, l4 . . . l(2×M$_c$)) where $M_c$ is the number of columns. The rows of quantum dots may be along an in-plane direction of the substrate layer. For example, the rows may be parallel to the x-direction. The columns of quantum dots may be along one direction on the plane of the substrate layer. For example, the columns may be parallel to the y-direction. For example, the quantum dots of each line (row or column) may be hosted in a respective qubit hosting area in accordance with a fin shaped structure.

The rows may or may not each have the same number of quantum dots. The columns may or may not each have the same number of quantum dots. The number of quantum dots of the row may or may not be the same as the number of quantum dots per column. The rows and the columns of the quantum dots may form a 2D array or matrix of quantum dots, such that each column may share a quantum dot with each crossing row at the crossing point. The rows and the columns of the quantum dots may be provided such that the rows may be separated by at least twice the qubit-qubit distance (QQ) and the columns of quantum dots may be separated by at least twice the qubit-qubit distance QQ. The distance between quantum dot columns (and between quantum dot rows) may be extended to any even number of qubit-qubit distances.

In one example, the number of rows $M_r$ differs from the number of columns $M_c$ by a predefined level. For example, $|M_r - M_c| > S$, where S is an integer number representing the level. This may be advantageous as it may enable a controlled arrangement of quantum dots. In one example, the number of quantum dots in the row may be different from the number of quantum dots in the column by a predefined sparsity level.

As described above with reference to the line l1, the magnet system may comprise a magnet on top of every other quantum dot of each further line l2, l3 . . . for providing the local magnetic field on said every other quantum dot. Each magnet may extend above or cover a single respective quantum dot. This may provide a 2D array of magnets on top of the 2D array of the quantum dots. For example, the magnet line covering line l2 may have magnets $MG_1^{l2}, MG_2^{l2} \ldots MG_{L_{mg}^{l2}}^{l2}$, the magnet line covering line l3 may have magnets $MG_1^{l3}, MG_2^{l3} \ldots MG_{L_{mg}^{l3}}^{l3}$ and so on, where the number of magnets may fulfill the following: $L_{mg}^{lk} = L_{mg}^{lh}$ if k and h are different odd numbers or k and h are different even numbers. The magnets may be placed above the quantum dots at the crossing points of the rows and columns of quantum dots e.g., for each pair of crossing row li and column lj, a magnet may be placed at each crossing point of the row li and column lj. Each magnet may also serve at the same time as the plunger gate controlling the quantum dot hosting the qubit.

The properties of the magnets as described with reference to line l1 may be the same properties for each further line l2, l3 . . . of the 2D structure. Additionally, or alternatively, the properties of the magnets among lines may be varied by choosing any of the magnet combinations mentioned before. For example, in case $nz_D = no_D = ns_D = 2$ and i the index of the line, the magnets may be provided such that:

$S_k^{li} \neq S_h^{li}$ if $k = h \pm 1$ and $S_k^{li} = S_h^{li}$ if $k = h \pm 2$ and $O_k^{li} = O_h^{li}$ $\forall k, \forall h$ and $\forall i$, and shape$_k^{li}$ = shape$_h^{li}$ $\forall k, \forall h$ and $\forall i$. Or, $S_k^{li} \neq S_h^{li}$ if $k = h \pm 1$ and $S_k^{li} = S_h^{li}$ if $k = h \pm 2$ and $O_k^{li} \neq O_h^{li}$ if $k = h \pm 1$ and $O_k^{li} = O_h^{li}$ if $k = h \pm 2$, and shape$_k^{li}$ = shape$_h^{li}$ $\forall k$, $\forall h$ and $\forall i$. Or, $S_k^{li} \neq S_h^{li}$ if $k = h \pm 1$ and $S_k^{li} = S_h^{li}$ if $k = h \pm 2$ and $O_k^{li} \neq O_h^{li}$ if $k = h \pm 1$ and $O_k^{li} = O_h^{li}$ if $k = h \pm 2$, and shape$_k^{li}$ ≠ shape$_h^{li}$ if $k = h \pm 1$ and shape$_k^{li}$ = shape$_h^{li}$ if $k = h \pm 2$.

If $MG_k^{li} = MG_h^{lj}$, then $S_k^{li} = S_h^{lj}$, $O_k^{li} = O_h^{lj}$, and shape$_k^{li}$ = shape$_h^{lj}$, as described above with reference to the 1D quantum dot array, the external magnetic field may have the following properties for the 2D structure. The external magnetic field is tilted with a predefined angle (θ) and angle (φ). The angle θ may be the projection of the magnetic field direction on a plane parallel to the substrate layer and parallel to the plane of quantum dots. The angle φ may be the angle between the out of plane direction and the external magnetic field. In one example, the angle θ is between 0 degree and 90 degrees. That is, 0°≤θ≤90°. In another example, the angle θ is in a range: [45−d1, 45+d2] degree, where d1 and d2 are predefined tolerance angle ranges in degree. That is, 45°−d1≤θ≤45°+d2. For example, d1=d2. Alternatively, d1≠d2. In one example, the angle θ may be 45 degrees. This tilt may provide an optimal solution for the symmetric designs. In one example, the angle φ is between 0 degree and 180 degrees. In another example, the angle φ is in a range: [90−d3, 90+d4] degree, where d3 and d4 are predefined tolerance angle ranges in degree. That is, 90°−d3≤φ≤90°+d4. For example, d3=d4. Alternatively, d3≠d4. In one example, the angle φ may be 90 degrees.

The present subject matter may thus enable an arrangement of nanomagnets on a square or rectangular grid with an external magnetic field applied tilted with respect to the qubit linear chain. The quantum dots and nanomagnets may be arranged in rows and columns that are separated by at least twice the qubit-qubit distance. The nanomagnets may be placed above the crossings between quantum dot rows and quantum dot columns. The distance between quantum dot columns (and quantum dot rows) can be extended to any even number of qubit-qubit distances, provided that a nanomagnet is placed above every second quantum dot, thus arranging the nanomagnets also in a square (or rectangular)

grid. The nanomagnet may also serve at the same time as the plunger gate controlling the quantum dot hosting the qubit. If the spin qubits are placed at corresponding positions within the square arrangement, this magnet design combined with the tilted external magnetic field may allow to reach a difference of above 1 GHz in qubit frequency between adjacent quantum dots, 4 mT/nm perpendicular magnetic field gradient and an in-plane first-order insensitivity to the parallel magnetic field gradient (thus reducing decoherence of the qubits).

In one example, the set of control gates comprises a plunger gate on top of each quantum dot, and barrier gates alternating with the plunger gates. The barrier gate may refer to a gate configured to confine the quantum dot in a direction along the quantum dot line. Each barrier gate may define a tunnel barrier between each pair of adjacent quantum dots. The plunger gate may refer to a gate configured to control a (electrochemical) potential of a respective quantum dot. Each plunger gate may be associated with a respective quantum dot. Each plunger gate may control the charge accumulated at the associated quantum dot.

The present subject matter may have the following advantages. For magnetization, fields above 0.1 T may allow already to achieve a symmetric state and the pattern may not change up to 0.5 T external field. For the addressability, the present design may reach around 2200 MHz difference between neighbour qubits (≈0.08 T), while next-nearest neighbours have again the same value. If needed, the Larmor frequency of next-nearest neighbours may be shifted by changing the sizes of the middle magnet, at the expenses of lowering the driving gradient. The gradients may be around 6 mT/nm for the qubits below the magnetic plunger and 4 mT/nm for the qubits in between, exceeding state of the art by a factor of 2 at least. Decoherence gradient along the in-plane directions (x and y) may be minimized due to symmetry reasons. Along the z direction it may have a similar value as the driving gradients, but the confinement here may be enhanced with respect to the other two directions. As to the fabrication of the qubit device, the distance between magnet and qubit may have to be decreased as much as possible. In one example implementation, barrier gates and non-magnetic plunger gates may be made with a width of e.g., 10 nm respectively 20 nm, and the oxide layer between the different gates may have a thickness of e.g., 3 nm.

Implementation of embodiments of the invention may take a variety of forms, and exemplary implementation details are discussed subsequently with reference to the Figures.

The present invention will now be described in detail with reference to the Figures.

Figure 1:
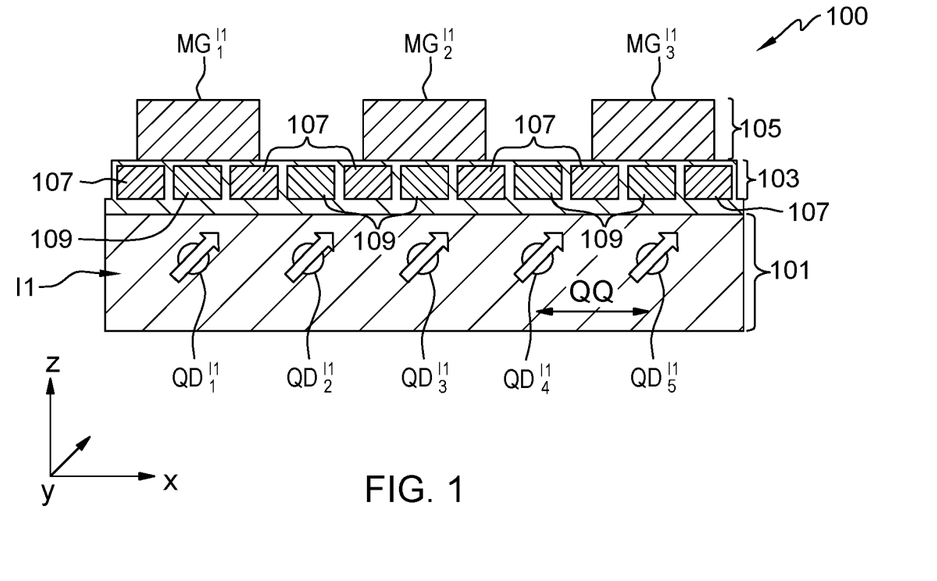
FIG. 1 is a cross-sectional view of a qubit device, in accordance with an embodiment of the present invention.

FIG. 1 depicts a cross-sectional view of a qubit device 100, in accordance with an embodiment of the present invention. The qubit device 100 may be provided in accordance with a 1D structure.

The qubit device 100 may be provided with a layer structure including a substrate layer 101 and a layer 103, named gate layer, on top of the substrate layer 101. The substrate layer 101 may, for example, be a germanium layer, a silicon layer; a silicon layer of silicon material or other materials such as GaAs and SiGe.

The gate layer 103 may comprise control gates. The gate layer 103 is shown as a single layer structure but may typically comprise multiple layers of different conductive and dielectric materials. The dielectric material may, for example, comprise a silicon oxide or other inter-layer dielectrics. The gate layer 103 comprises barrier gates 107 alternating with plunger gates 109, wherein the plunger gates 109 are placed on top of the respective quantum dots.

The control gates may be configured to define a line l1 of a number $N_{l1}$ of quantum dots $QD_1^{l1}$, $QD_2^{l1}$ .... $QD_{N_{l1}}^{l1}$ at an interface between the substrate layer 101 and the gate layer 103, where $N_{l1} \geq 2$. The superscript l1 in the quantum dot reference indicates that the quantum dot belongs to the line l1 and the subscript indicates the index of the quantum dot. The index of the quantum dot of the line l1 may be a number between 1 and $N_{l1}$. The index may be incremented by one following the order of the quantum dots from the left end to the right end of the line l1. Two quantum dots $QD_i^{l1}$ and $QD_j^{l1}$ are adjacent if $i=j\pm1$. The quantum dots may be electrostatically confined quantum dots along the substrate layer 101. The line l1 of quantum dots may provide a 1D qubit array. The line l1 may be a line in parallel to an in-plane direction. As indicated in FIG. 1, the in-plane may be defined by the x and y directions and the out-of-plane direction may be defined by z direction. For example, the line l1 may be parallel to the x direction or to the y direction. Five quantum dots (i.e., $N_{l1}=5$) are shown for simplification of the description, but it is not limited to as other numbers of quantum dots higher than two may be used.

Each quantum dot of the quantum dots $QD_1^{l1}$, $QD_2^{l1}$ .... $QD_5^{l1}$ may hold an electron defining a qubit. For example, the quantum dots may be semiconductor quantum dots formed in a silicon-based platform, Ge platform or GaAs platform. This may enable a compact realization of spin qubits for employing conventional fabrication techniques from CMOS technology and enabling scalable qubit systems. The quantum dot spin qubits may be controlled using EDSR. For example, the spin states may be manipulated by radio-frequency AC electric fields.

The qubit device 100 may further comprise a magnet system 105 comprising a number $L_{mg}^{l1}$ of nanomagnets $MG_1^{l1}$, $MG_2^{l1}$ .... $MG_{L_{mg}^{l1}}^{l1}$ and an external magnetic field source (not shown). In this example, the number $L_{mg}^{l1}$ of nanomagnets is three, based on the exemplified number of quantum dots. As indicated in FIG. 1, the nanomagnets are indexed in a similar manner as the quantum dots. The magnet system may be configured to provide an external magnetic field. The magnet system may further provide local magnetic fields at the quantum dots $QD_1^{l1}$, $QD_2^{l1}$ .... $QD_5^{l1}$ respectively. Thus, the magnet system may enable to provide a superposition of the external magnetic field to the local magnetic fields. This superposition may enable that qubit spin resonance frequencies of adjacent quantum dots of the line l1 are different. The elements of the qubit device may be isolated using an insulator such as SiO2.

In one example, the substrate layer with a fin shape may be provided similar to what is used in a fin field-effect transistor (FinFET). A possible fabrication route for a quantum dot array on a fin-shaped substrate may be provided as follows. Regarding the magnetic structures: a gate stack may be provided as currently done, magnets may be defined either by electron beam lithography or thermal scanning probe lithography. Furthermore, etching techniques and deposition techniques including but not limited to physical vapor deposition (PVD), chemical vapor deposition (CVD), and atomic layer deposition (ALD) or any combination thereof may also be used to obtain the magnets.

Figure 2A:
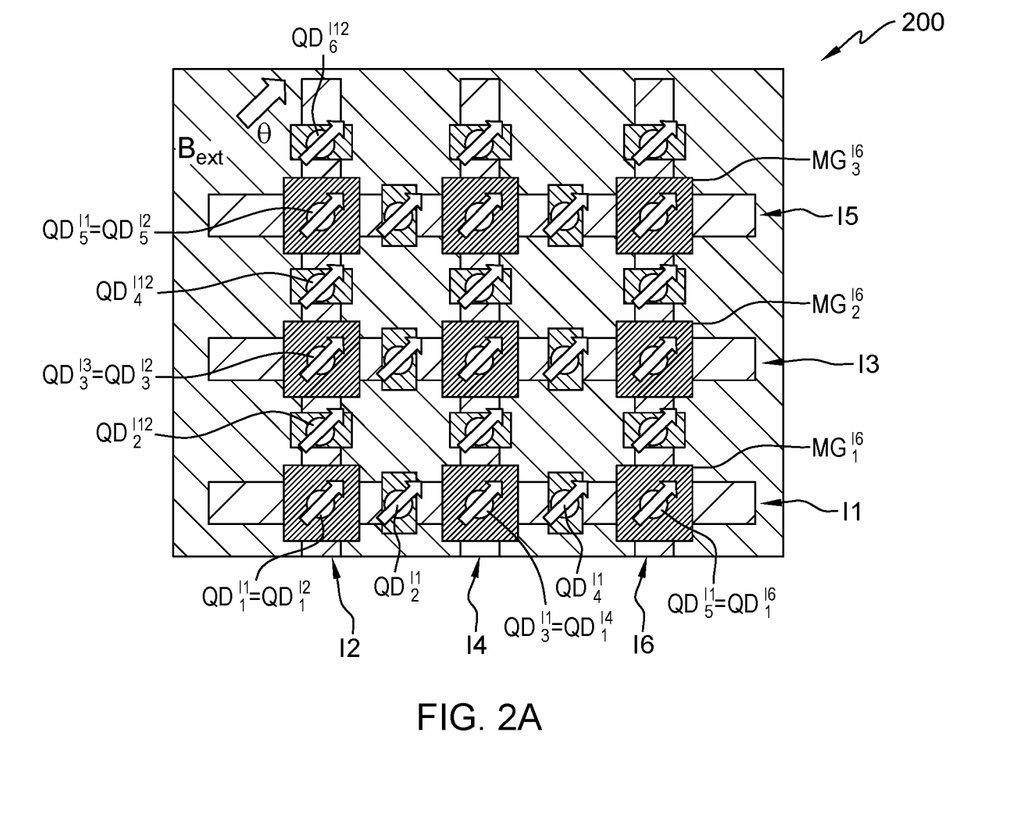
FIG. 2A is a schematic top-down view of the qubit device, in accordance with an embodiment of the present invention.

FIG. 2 depicts a schematic top-down view of a qubit device 200 in accordance with an example of the present subject matter. The qubit device 200 may be provided in accordance with a 2D structure.

The qubit device 200 comprises a 2D array of quantum dots comprising rows l1, l3 and l5 of quantum dots and crossing columns 12, 14 and 16 of quantum dots. The quantum dots of each row may be indexed following their order from the left end to the right end (or from right to the left). The quantum dots of each column may be indexed following their order from the bottom to the top (or from top to the bottom). The row 11 may comprise quantum dots $QD_1^{l1}$, $QD_2^{l1}$ .... $QD_5^{l1}$. The row 13 may comprise quantum dots $QD_1^{l3}$, $QD_2^{l3}$ .... $QD_5^{l3}$. The row 15 may comprise quantum dots $QD_1^{l5}$, $QD_2^{l5}$ .... $QD_5^{l5}$. The column 12 may comprise quantum dots $QD_1^{l2}$, $QD_2^{l2}$ .... $QD_6^{l2}$. The column 14 may comprise quantum dots $QD_1^{l4}$, $QD_2^{l4}$ .... $QD_6^{l4}$. The column 16 may comprise quantum dots $QD_1^{l6}$, $QD_2^{l6}$ .... $QD_6^{l6}$. This symmetric 2D structure of FIG. 2A implies that quantum dots are shared between the rows and columns at the crossing points, that is, $QD_1^{l2}=QD_1^{l1}$, $QD_3^{l2}=QD_1^{l3}$, $QD_5^{l2}=QD_1^{l5}$, $QD_1^{l4}=QD_3^{l1}$, $QD_3^{l4}=QD_3^{l3}$, $QD_5^{l4}=QD_3^{l5}$, $QD_1^{l6}=QD_5^{l1}$, $QD_3^{l6}=QD_5^{l3}$ and $QD_5^{l6}=QD_5^{l5}$.

The number of columns and rows is provided for exemplification purpose only, but it is not limited to the exemplification. Also, the number of quantum dots per row and columns is provided for exemplification purpose only but it is not limited to the exemplification. The person skilled in the art, provided with the necessary properties, may apply the solution to other configurations of the rows and columns of the qubit device.

The qubit device 200 comprises a magnet system comprising nanomagnets and an external magnetic source (not shown). The magnet system may comprise a nanomagnet on top of every other quantum dot of each row and each column for providing the local magnetic field on said every other quantum dot. In this example, the nanomagnets are placed on top of the crossing points of the rows and the columns. This may result in a magnet row of nanomagnets $MG_1^{l1}$, $MG_2^{l1}$ and $MG_3^{l1}$ extending over the quantum dots $QD_1^{l1}$, $QD_3^{l1}$ and $QD_5^{l1}$ of row 11 respectively, a magnet row of nanomagnets $MG_1^{l3}$, $MG_2^{l3}$ and $MG_3^{l3}$ extending over the quantum dots $QD_1^{l3}$, $QD_3^{l3}$ and $QD_5^{l3}$ of row 13 respectively and a magnet row of nanomagnets $MG_1^{l5}$, $MG_2^{l5}$ and $MG_3^{l5}$ extending over the quantum dots $QD_1^{l5}$, $QD_3^{l5}$ and $QD_5^{l5}$ of row 15 respectively. This may also define three magnet columns of nanomagnets. The first magnet column comprises nanomagnets $MG_1^{l1}$, $MG_1^{l3}$ and $MG_1^{l5}$ extending over the quantum dots $QD_1^{l2}$, $QD_3^{l2}$ and $QD_5^{l2}$ respectively. The second magnet column comprises nanomagnets $MG_2^{l1}$, $MG_2^{l3}$ and $MG_2^{l5}$ extending over the quantum dots $QD_1^{l4}$, $QD_3^{l4}$ and $QD_5^{l4}$ respectively. The third magnet column comprises nanomagnets $MG_3^{l1}$, $MG_3^{l3}$ and $MG_3^{l5}$ extending over the quantum dots $QD_1^{l6}$, $QD_3^{l6}$ and $QD_5^{l6}$ respectively. Since, in this example, the distance between the rows of quantum dots and the distance between the columns of quantum dots is only 2 QQ, all the nanomagnets are shared between the magnet rows and magnet columns in the qubit device 200 e.g., $MG_1^{l1}=MG_1^{l6}$, $MG_3^{l3}=MG_2^{l6}$ and $MG_3^{l5}=MG_3^{l6}$.

As indicated in FIG. 2A, the external magnetic field provided by the external magnetic source may be tilted by an angle θ with respect to the row of the qubit device.

For simplification of the drawings, only part of the elements is referenced.

Figure 2B:
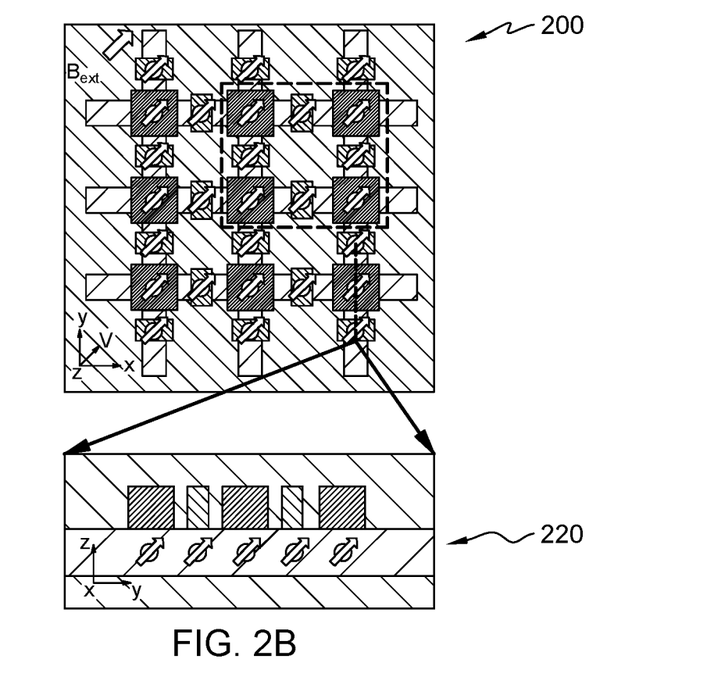
FIG. 2B is a cross-sectional view of the qubit device taken along a line indicated in FIG. 2A, in accordance with an embodiment of the present invention.

FIG. 2B shows a cross-section 220 of the qubit device 200 taken along the dashed line indicated in FIG. 2A, in accordance with an embodiment of the present invention. Cross-section 220 shows a layer of nanomagnets that are placed on top of every other quantum dot and are alternating with plunger gates. The nanomagnet in this example may also serve as a plunger gate. Other gates such as the barrier gates are not shown for simplification of the drawings.

Figure 2C:
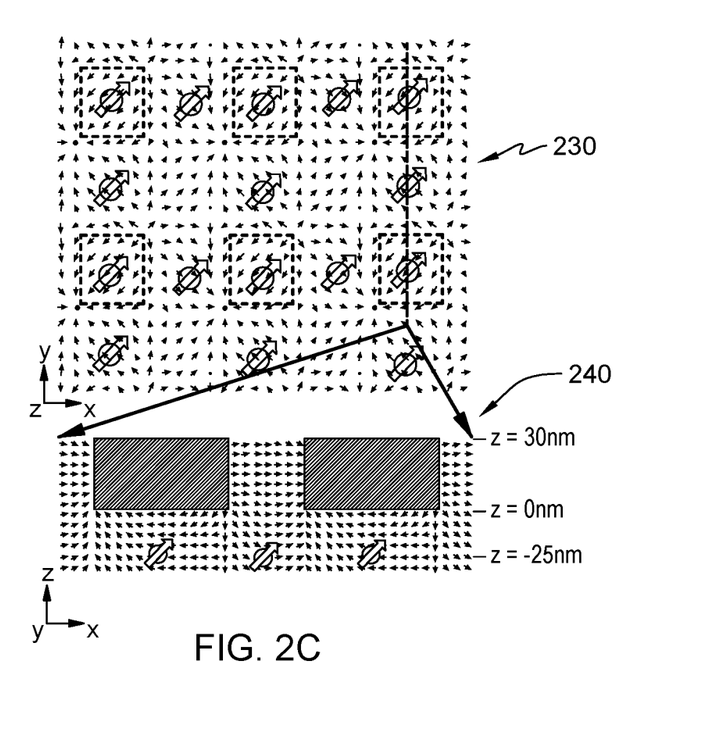
FIG. 2C is a stray field of magnetic structures shown in FIG. 2A, in accordance with an embodiment of the present invention.

FIG. 2C shows stray field 230 per quantum dot, in accordance with an embodiment of the present invention. Due to the checkerboard arrangement of the 2D array 200 and the tilted external magnetic field, the stray field in the plane of the qubits changes its orientation also in a checkerboard fashion. This may allow inherent single qubit addressability, symmetric driving fields if displaced along x and y direction and decoherence sweet spot at qubit location. FIG. 2C further shows a cross-section 240 of the field 230 taken along the line indicated in FIG. 2B. The cross-section 240 indicates the height of the nanomagnets of 30 nm, the position of the gate layer and the quantum dot.

Figure 3:
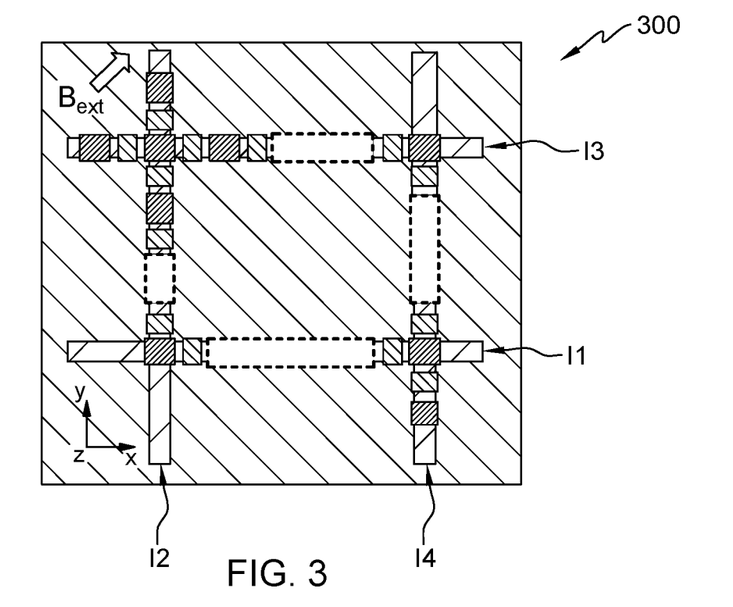
FIG. 3 is a schematic top-down view of the qubit device, in accordance with an embodiment of the present invention.

FIG. 3 depicts a schematic top-down view of qubit device 300, in accordance with an embodiment of the present invention. The qubit device 300 may be provided in accordance with a 2D structure referred to as sparse array structure.

The qubit device 300 comprises two rows 11 and 13 of quantum dots and two columns 12 and 14 of quantum dots. The difference between the qubit device 300 and the qubit device 200 of FIG. 2A may reside in the fact that the number of quantum dots in each row/column of qubit device 300 is much higher than the number of quantum dots in each row/column of qubit device 200 and that the distance between two neighboring columns and/or two neighboring rows is in qubit device 300 is much higher (in term of QQ distance) than the distance between the rows/columns in qubit device 200. As with the qubit device 200, the nanomagnets are placed over each other quantum dot in each row and each column.

Figure 4:
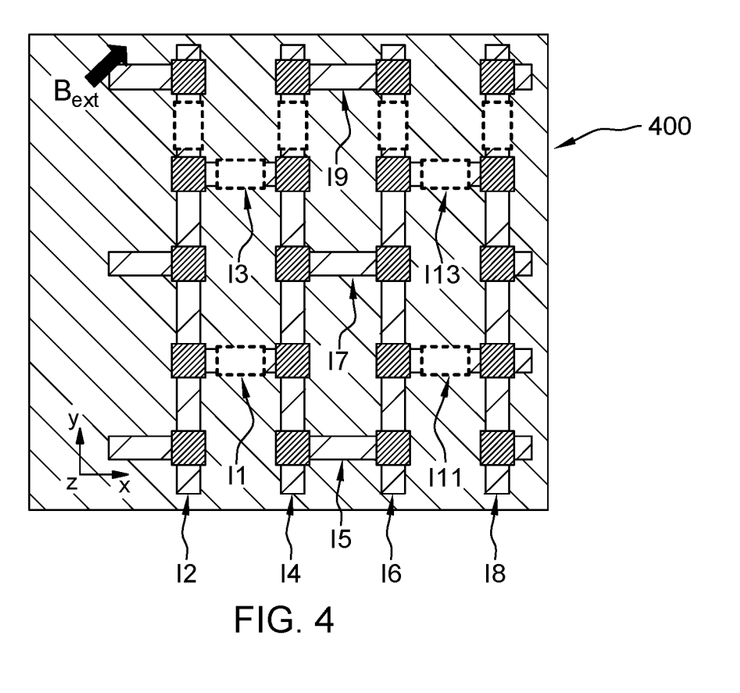
FIG. 4 is a schematic top-down view of the qubit device, in accordance with an embodiment of the present invention.

FIG. 4 depicts a schematic top-down view of qubit device 400, in accordance with an embodiment of the present invention. The qubit device 400 may be provided in accordance with a 2D structure referred to as "variable sparsity" array.

The quantum device 400 comprises seven rows 11, 13, 15, 17, 19, 111 and 113 and four columns 12, 14, 14 and 16. The rows and columns are arranged in a "heavy hex" structure as shown in FIG. 4. The rows 11 and 13 are placed between columns 12 and 14. The rows 15, 17 and 19 are placed between columns 14 and 16. The rows 111 and 113 are placed between columns 16 and 18. As with the qubit device 200, the nanomagnets are placed over each other quantum dot in each row and each column. Rows 11 and 13 can have a different number of quantum dots as e.g., 15, 17 and 19. In addition, the number of quantum dots in columns 12, 14, 16 and 18 between the crossings with 13/113 and 19 may contain a different number of quantum dots as compared to other segments between crossings.

Figure 5:
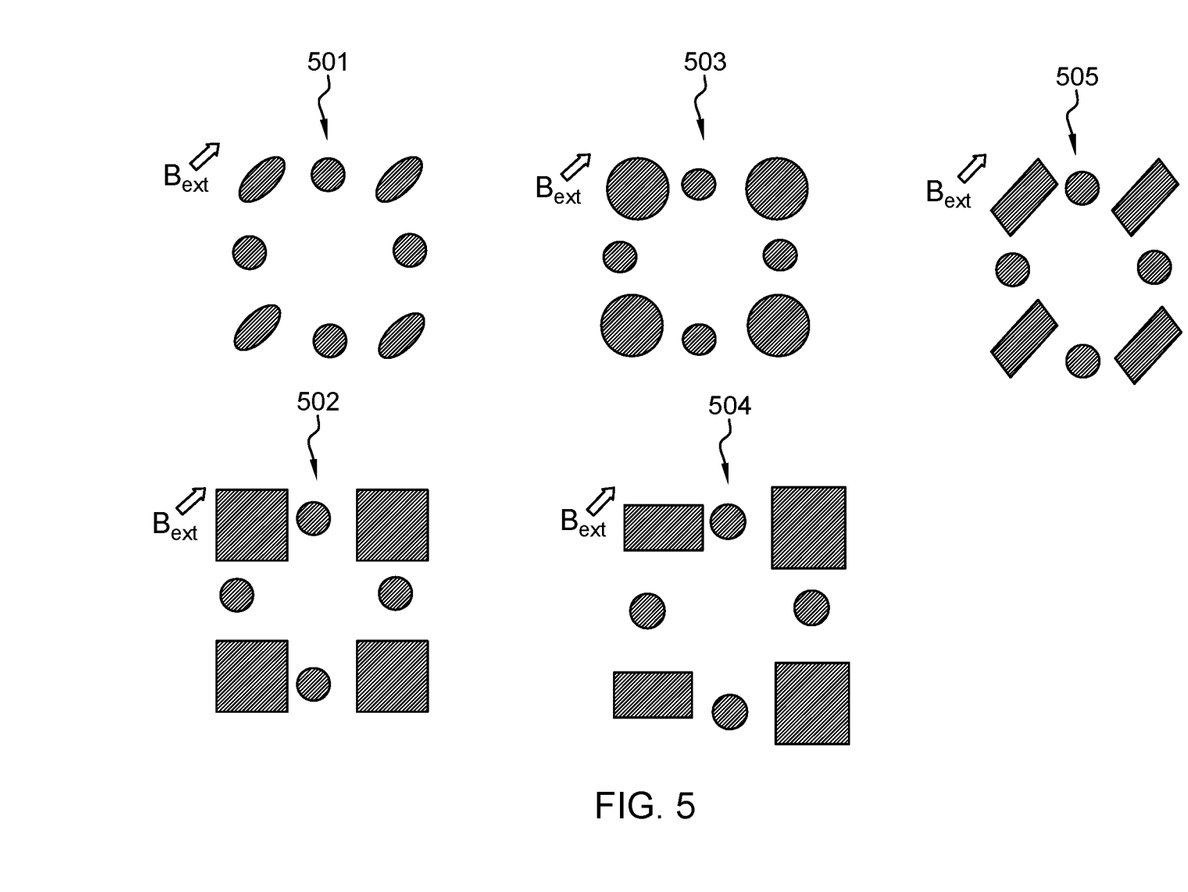
FIG. 5 is an illustration of different magnet configurations of a quantum device, in accordance with an embodiment of the present invention.

FIG. 5 a schematic top-down view of a section of the qubit device 200 illustrating different magnet designs of that section in accordance with an example of the present subject matter. Said section of the qubit device 200 is indicated by a dashed square in FIG. 2B. The same design of the depicted section may be repeated or replicated to build a complete qubit device.

For example, as indicated in FIG. 5, qubit device section 501 may comprise nanomagnets of elliptic shapes and a tilted orientation. Qubit device section 502 may comprise nanomagnets of cubic shapes and a planar orientation. Qubit device section 503 may comprise nanomagnets of spheric shapes and planar orientation. Qubit device section 504 may comprise nanomagnets of two different shapes namely cubic and cuboid shapes and a planar orientation. Qubit device section 505 may comprise nanomagnets of cuboid shapes and a tilted orientation. The (small) round points in each qubit device represent non-magnetic plunger gates.

The qubit device section 502 may represent the symmetric design and the qubit device section 505 may represent a tilted design. In the symmetric design, the field may be strong (>0.1 T), the angle θ in a range between 25 and 65 degree and the angle φ between 60 and 130 degrees. In the tilted design, the field can be oriented with angle θ between 0 and 90 degrees, the angle φ between 0 and 180 degree and the magnitude may be smaller than 0.1 T (but above 0.02 T).

Figure 6:
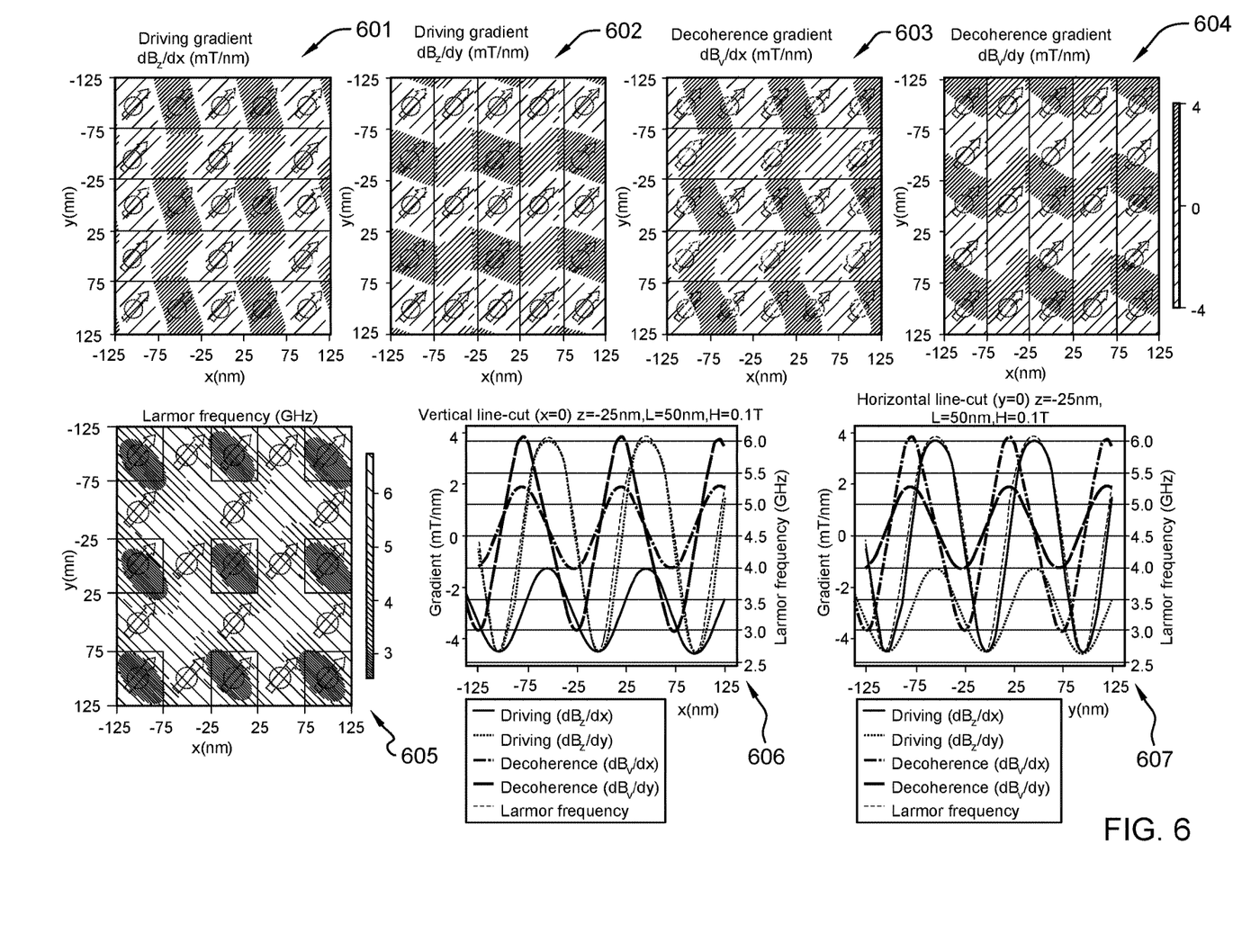
FIG. 6 is an illustration of various properties of a magnetic field obtained using an example configuration of nanomagnets shown in FIG. 2A, in accordance with an embodiment of the present invention.

FIG. 6 depicts an illustration of various properties of a magnetic field obtained using an example configuration of nanomagnets shown in FIG. 2A, in accordance with an embodiment of the present invention. Plot 601 shows the magnetic gradient field component dBz/dx. As shown, the use of nanomagnets and the external magnetic field may enable an in-plane magnetic gradient on the order of 4 mT/nm. Plot 602 shows the magnetic gradient field component dBz/dy. Plot 603 shows the transverse magnetic gradient field component dBv/dx. The direction parallel to the external magnetic field is denoted as v. As shown, the use of nanomagnets and the external magnetic field may enable a zero-crossing for the decoherence magnetic gradient dBv/dx. Plot 604 shows the transverse magnetic gradient field component dBv/dy. As shown the use of nanomagnets and the external magnetic field may enable a zero-crossing for the decoherence magnetic gradient dBv/dy.

Plot 605 shows the Larmor frequency of the qubit of the qubit device 200. As shown, the use of nanomagnets and the external magnetic field may enable to reach a difference of above 1 GHz in qubit frequency between adjacent qubits.

Plots 606 and 607 show the magnetic field gradient indicated in plots 601 to 605 as function of x and y respectively. Plot 606 represents a vertical line-cut and Plot 607 represents a horizontal line-cut. As shown in plots 606 and 607 the maxima of the driving gradient coincide with the zero-crossing of the decoherence gradients. Moreover, the symmetry between the vertical and horizontal cuts can be seen, allowing strong driving gradients with displacements both along x and y direction.

On the plots 601 to 605, the position of magnets and qubits is shown overlayed.

Figure 7:
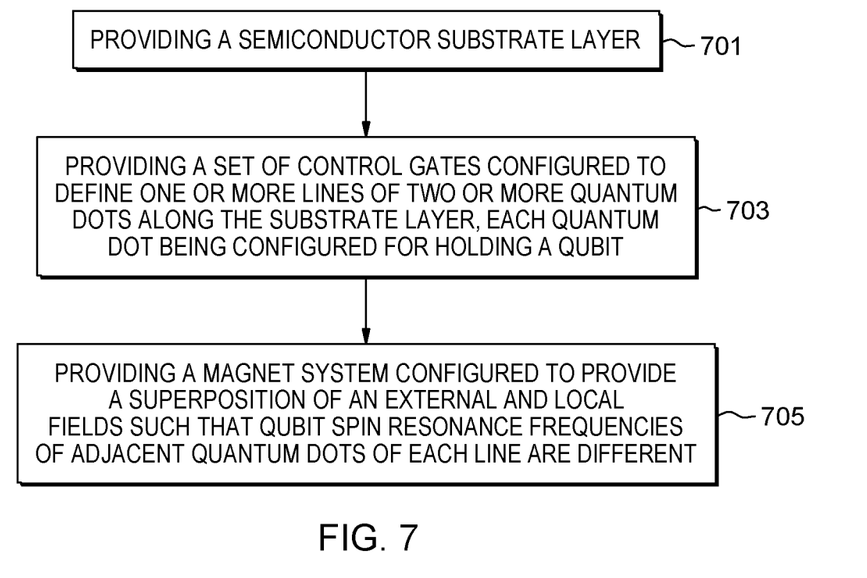
FIG. 7 is a flowchart of a method for operating the quantum device, in accordance with an embodiment of the present invention.

FIG. 7 is a flowchart of a method for forming a quantum device according to an example of the present subject matter.

A semiconductor substrate layer may be provided in step 701. A set of control gates may be provided in step 703. The set of control gates may be configured to define one or more lines of two or more quantum dots along the substrate layer, each quantum dot being configured for holding a qubit. A magnet system may be provided in step 705. The magnet system may be configured to provide a superposition of an external and local fields such that qubit spin resonance frequencies of adjacent quantum dots of each line are different.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

What is claimed is:

1. A qubit device comprising:
    a semiconductor substrate layer;
    a set of control gates defining one or more lines of two or more quantum dots along the substrate layer, each quantum dot being configured for holding a qubit; and
    a magnet system providing at the substrate layer a superposition of external and local magnetic fields such that qubit spin resonance frequencies of each pair of adjacent quantum dots in each line are different, the magnet system comprising an external magnetic field source for providing the external magnetic field and comprising a magnet on top of every other quantum dot for providing the local magnetic field.

2. The qubit device of claim 1, wherein the superposition of the external and local fields is provided such that:
    a magnetic field gradient perpendicular to the total magnetic field is maximized at a location of the quantum dot; and
    the magnetic field gradient parallel to the total magnetic field is minimized the location of the quantum dot.

3. The qubit device of claim 1, wherein the external magnetic field is tilted with two predefined angles with respect to the line of the quantum dots, with one angle (θ) of the two angles being a projection of the external magnetic field on the plane where the quantum dots are arranged and the second one (φ) of the two angles being the angle between an out of plane direction and the external magnetic field.

4. The qubit device of claim 3, the angle θ is between 0 degree and 90 degrees and the angle φ is between 0 degree and 180 degrees.

5. The qubit device of claim 1, the one or more lines being multiple rows and columns forming an array of quantum dots.

6. The qubit device of claim 5, a number of rows being higher than a number of columns by a predefined sparsity level.

7. The qubit device of claim 1, wherein the magnet on top of every other quantum dot serves as a plunger gate.

8. The qubit device of claim 1, the magnets of the magnet system having a selection from the group consisting of: same shapes and different shapes.

9. The qubit device of claim 1, the magnet of the magnet system having a selection from the group consisting of: a cubic shape and a cuboid shape.

10. The qubit device of claim 1, the magnet of the magnet system having a spherical shape.

11. The qubit device of claim 1, the magnets being placed in a second layer on top of a first layer of the set of control gates, the first layer of the set of control gates being on top of the substrate layer.

12. The qubit device of claim 5, wherein a number of the quantum dots in the row are different from a number of the quantum dots in the column by a predefined sparsity level.

13. The qubit device of claim 1, wherein twice a pitch of the quantum dot exceeds a magnet size of the magnet by a minimum distance.

14. The qubit device of claim 1, the set of control gates comprising a plunger gate on top of each quantum dot and barrier gates alternating with the plunger gates.

15. A method of forming a quantum device comprising:
    providing a semiconductor substrate layer;
    providing a set of control gates configured to define one or more lines of two or more quantum dots along the substrate layer, each quantum dot being configured for holding a qubit; and
    providing a superposition of an external and local magnetic fields at the substrate layer such that qubit spin resonance frequencies of each pair of adjacent quantum dots in each line are different, a magnet system comprising an external magnetic field source for providing the external magnetic field and comprising a magnet on top of every other quantum dot for providing the local magnetic field.

16. The method of claim 15, wherein the superposition of the external and local fields is provided such that:
a magnetic field gradient perpendicular to a total magnetic field is maximized at a location of the quantum dot; and
the magnetic field gradient parallel to the total magnetic field is minimized the location of the quantum dot.

17. The method of claim 15, wherein the external magnetic field is tilted with two predefined angles with respect to the line of the quantum dots, with one angle ($\theta$) of the two angles being a projection of the external magnetic field on the plane where the quantum dots are arranged and the second one ($\varphi$) of the two angles being the angle between an out of plane direction and the external magnetic field.

18. The method of claim 15, the magnet system comprising an external magnetic field source for providing the external magnetic field and comprising a magnet on top of every other quantum dot for providing the local magnetic field.

19. The method of claim 17, the angle $\theta$ is between 0 degree and 90 degrees and the angle $\varphi$ is between 0 degree and 180 degrees.

20. The method of claim 15, the one or more lines being multiple rows and columns forming an array of quantum dots.

\* \* \* \* \*